United States Patent [19]

McClure

[11] 4,104,914
[45] Aug. 8, 1978

[54] FLOW MONITORING

[76] Inventor: Charles A. McClure, 5 Laurel Cir., Malvern, Pa. 19355

[21] Appl. No.: 724,979

[22] Filed: Sep. 20, 1976

[51] Int. Cl.² .............................................. G01F 1/00
[52] U.S. Cl. .................................................. 73/194 F
[58] Field of Search ............ 73/194 F, 194 E, 304 R; 324/30 B

[56] References Cited

U.S. PATENT DOCUMENTS

| | | | |
|---|---|---|---|
| 1,611,502 | 12/1926 | Allen | 73/194 F |
| 1,616,481 | 2/1927 | Allen | 73/194 F |
| 1,882,316 | 10/1932 | Cleary | 324/30 B |
| 2,650,343 | 8/1953 | Thompson | 324/30 B |
| 2,985,827 | 5/1961 | Hasenkamp | 324/30 B |
| 3,139,085 | 6/1964 | Custance et al. | 324/30 B |
| 3,370,466 | 2/1968 | Chang | 73/304 R |
| 3,965,740 | 6/1976 | Martig | 73/215 |

Primary Examiner—Anthony V. Ciarlante
Attorney, Agent, or Firm—Charles A. McClure

[57] ABSTRACT

A probe adapted to fit an open end of a sewer or water conduit is provided with jets at an upstream portion and sensors at a downstream portion for detecting jetted fluid. In conjunction with timing means and with means for determining flow depth, such as a bubbler device, highly accurate monitoring of flow rate and volume becomes feasible.

7 Claims, 5 Drawing Figures

FLOW MONITORING

This invention relates to improvement in monitoring of flow in an open-ended sewer or water conduit and concerns especially probe means readily insertable into and removable from such open end, as well as a method of determining flow rate and volume by means of such probe and related apparatus.

Known methods for monitoring flow in a sewer or water conduit normally running only partially full rely upon indirect methods of estimating flow velocity. These include the slope-area method, in which the well known Manning flow equation is employed, and the use of flow-rating devices, such as weirs and flumes, for which other equations are known that relate flow rate to flow depth as altered by the configurational constraints imposed upon the flow by the particular weir or flume geometry.

The foregoing methods of monitoring flow are limited in their degrees of accuracy because they do not measure flow rate directly but seek to derive it from depth measurement. Other methods seek to derive flow from electromagnetic effects thereof or from physical effects resulting from introduction of sensors supported at a given position within the flow. Although the latter methods are suited to use in clean water (or other liquid) they are not suited to monitoring of wastewater flow because of interference of the sensor with the flow and of debris or other solids with the sensor.

A primary object of the present invention is flow monitoring in an open-ended sewer or like conduit via introduction of a probe capable of sensing flow velocity directly.

Another object is provision of a flow velocity probe for use in the open end of a sewer or like conduit along the inside wall thereof without interfering with the flow.

A further object is arrangement of apparatus for use in accomplishing the foregoing objects.

Other objects of the present invention, together with means and methods for attaining the various objects, will be apparent from the following description and the accompanying diagrams of a preferred apparatus embodiment of the invention, which is presented by way of example rather than limitation.

Figure 3:
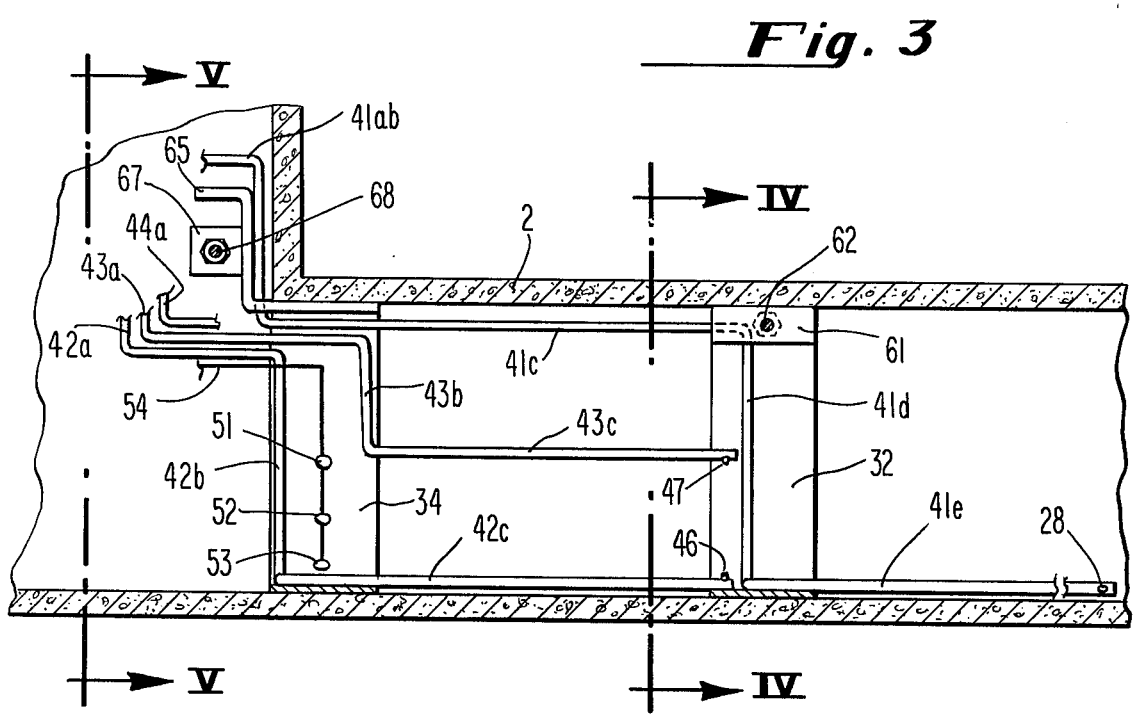
FIG. 3 is a side elevation, partly sectioned away, and partly schematic, of the same probe apparatus in the same setting.
Figure 5:
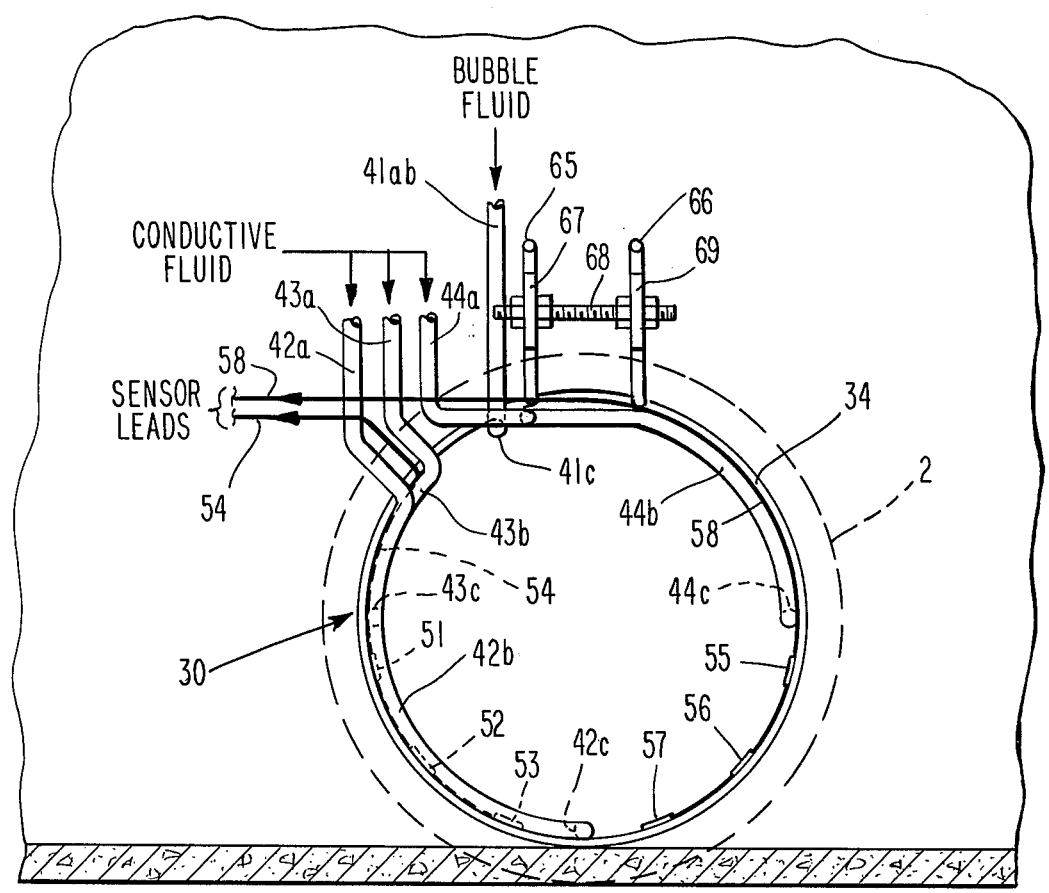

FIG. 5 is an end elevation of the same probe, when looking upstream at the downstream end, at V—V on FIG. 3; and In general, the objects of the present invention are accomplished, in apparatus for monitoring flow in a conduit having an open downstream end, by means of an improved sensing probe comprising a plurality of sensors for sensing electrical conductivity therebetween, means for supporting the sensors along the inside wall of the conduit, a plurality of jets for ejecting electrically conductive fluid, means for supporting the jets along the inside wall of the conduit upstream from the sensors, and tubing configured to lie along the conduit wall extending to the jets from the exterior.

The invention includes, more broadly, apparatus for monitoring flow in a conduit having an open end, comprising timing means, jet means responsive to the timing means, means for supplying electrically conductive fluid to the jet means, means for supporting the jet means within the conduit and upstream from the open end thereof, means for sensing electrical conductivity, and means for supporting the sensing means within the conduit downstream of the jet means, the timing means being adapted to time the period of travel of electrically conductive fluid ejected by the jets into the flow in the conduit until reaching the sensing means.

The invention, insofar as it extends to flow depth measurement, comprehends means for supplying electrically non-conductive fluid for bubbling, a probe fitting within the open end of the conduit and including a bubble tube for receiving the compressed fluid and bubbling it into the flow liquid via an outlet at the end of the tube, means for supplying electrically conductive fluid for jetting, the probe also including jet means located downstream from the bubble outlet for jetting electrically conductive fluid into the flow, and the probe also including sensor means further downstream for detecting electrically conductive fluid in the flow.

The invention includes, therefore, means for supplying compressed electrically non-conductive fluid for bubbling, means for supplying under pressure electrically conductive fluid, and interconnecting means for conveying the bubbling fluid and for conveying the conductive fluid separately to probe means adapted to fit within an open end of a conduit and to lie along the inside wall thereof; the probe including electrical conductivity sensing means for sensing electrically conductive fluid in the flow within the end of the conduit, jet means upstream therefrom to jet such electrically conductive fluid into the flow through the conduit, and means further upstream to release bubbling fluid at an outlet adjacent the flow bed into the overlying flow; timing means for effecting intermittent jetting of the conductive fluid into the flow through the conduit and for determining the period of time for such flow to reach the sensing means and the rate of such flow, and recording means responsive to back pressure of the overlying flow at the bubble outlet as an indicator of flow depth and responsive also to the determined flow rate and adapted to record simultaneously occurring flow depth and flow rate.

Figure 1:
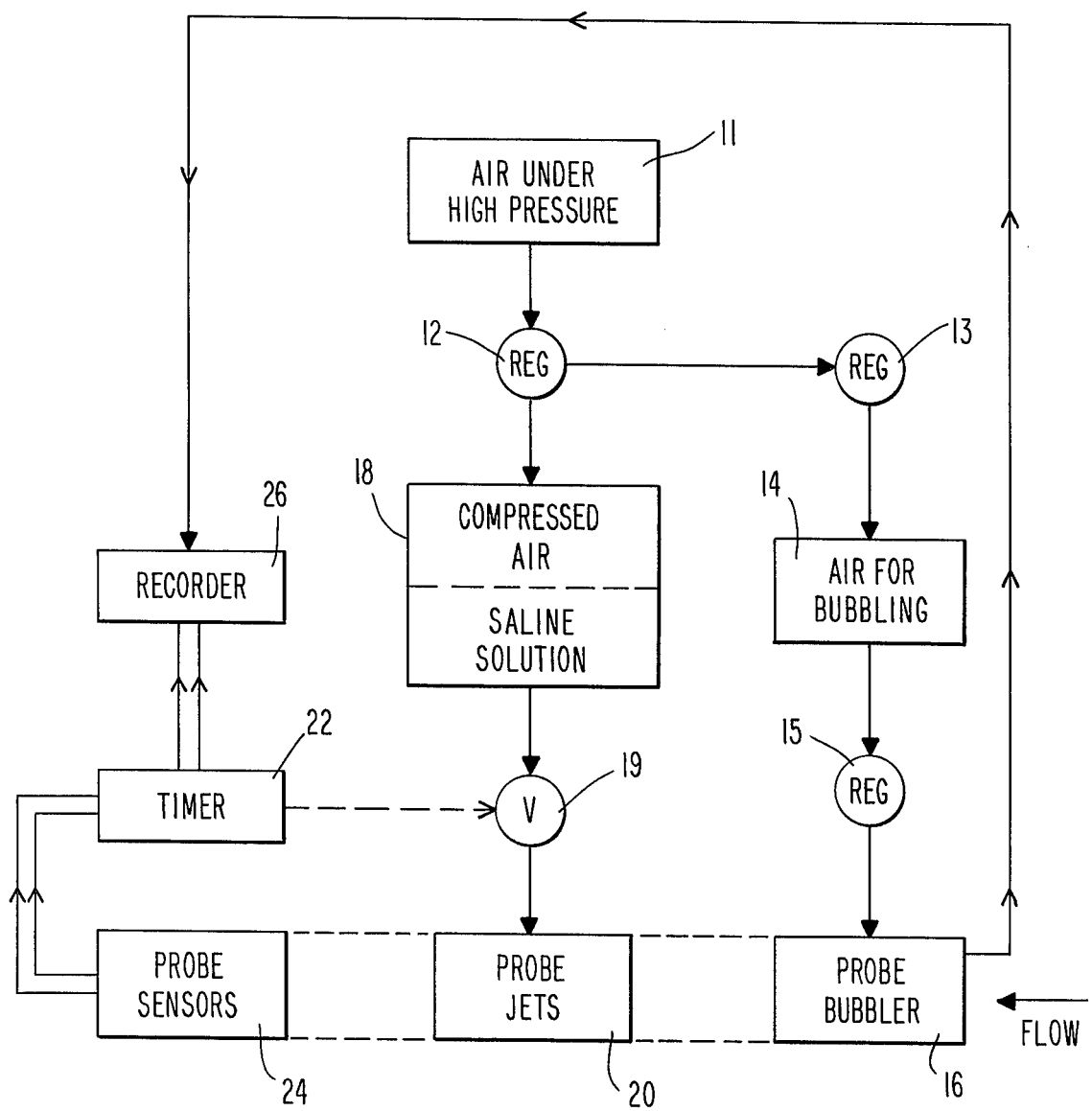
FIG. 1 is a schematic or block diagram of apparatus useful according to this invention.

FIG. 1 shows schematically apparatus components of the present invention and their interconnection to one another and to related apparatus components. Pressure vessel 11 supplies air under high pressure to pressure regulator 12, which reduces the pressure, then to another pressure regulator 13, from which supply 14 of air for bubbling at even lower pressure is fed through adjustable flow regulator 15 and from there to probe bubbler outlet 16. Additionally, compressed air at the reduced pressure provided by regulator 12 is supplied to tank 18 of aqueous saline solution to overlie such solution and apply pressure thereto. Saline solution from tank 18 flows through valve 19 (when opened by timer 22) to probe jets 20. Probe sensors 24, which are located downstream from probe jets 20, themselves downstream from probe bubbler 16, as indicated by the flow arrow, are connected electrically to timer 22. Probe bubbler 16 is connected pneumatically to recorder 26, as also indicated in the block diagram. More details of the respective components and their interconnections are set forth in subsequent views and/or description below.

Figure 2:
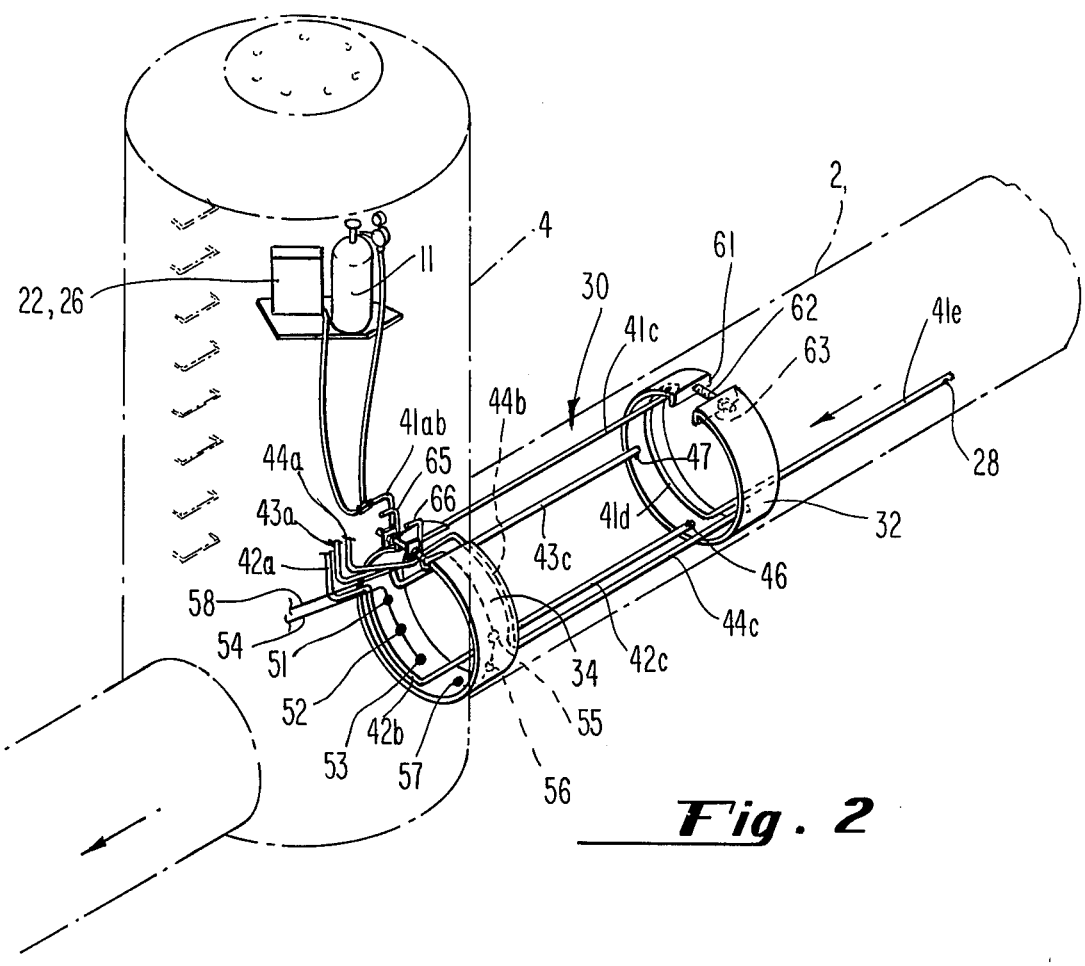
FIG. 2 is a perspective view of a flow probe of this invention shown in place in a sewer at its entrance to a manhole (the sewer conduit and manhole appearing in phantom), together with related items of apparatus.

FIG. 2 shows probe 30 of the present invention inserted into the open end of a sewer pipe 2 at the entrance to a manhole 4—both pipe and manhole appearing in phantom. FIG. 3 shows probe 30 in place in the same conduit 2 sectioned generally along a longitudinal medial vertical plane. Shown supported in the manhole are the pressure vessel and various regulators already described (the latter not separately identified here) together with timer 22 and recorder 26 in a single housing. The probe itself has, as principal components, forward or upstream collar 32, from the lowest portion of which bubbler tube 41e extends further upstream, and aft or downstream collar 34, which is interconnected to collar 32 by rigid tubing at the bottom, both sides, and at one end of the split top of each. Each collar is configured to lie along the inside wall of the conduit—here a round cylindrical pipe—and the tubing is configured similarly and is secured (as by brazing) to the inside wall of one or both collars, as the case may be.

Bubble tubing 41 (which has parts ab, c, and d) receives bubble fluid and supplies it to bubble tube outlets 28 on both sides (only one side visible) near the end of the bubbler tube 41e, which is affixed to and extends upstream from the lowermost portion of upstream collar 32. Part 41ab of the bubble tubing receives compressed fluid for bubbling from pressure vessel 11. Part 41c of the bubble tubing interconnects the left upper ends of both collars (to which it is secured, as aforesaid). Part 41d of the tubing is configured to lie along the inside wall of upstream collar 32 until reaching the lowermost portion thereof. Of course, portion 41c of the bubble tube establishes fixed spatial separation of the respective collars, at least insofar as their upper left ends are concerned.

FIG. 2 shows three additional runs of tubing: 42 a to c, 43a to c, and 44a to c, which are adapted to furnish electrically conductive fluid, as in the form of saline solution, to respective jets 46, 47, and 48 located on the inside wall of upstream collar 32, at the bottom, the left side, and the right side, respectively (looking upstream). Intermediate portion 42b of the first such tube lies along the semicircular arc of the inside wall of downstream collar 34, while intermediate portions 43b and 44b lie, respectively, along the upper quadrant of the left and right inside walls of that collar. In all three instances, the succeeding portions of the tubing extend parallel to one another and to bubble tube portion 41c, as well as the conduit axis, and tie together the two collars to whose inside walls they are secured.

Also affixed to the inside wall of downstream collar 34 are sensors for electrical conductivity: 51, 52, and 53 on the left arm of the collar, located respectively about midway between the top and the bottom, about one-third of the way up from the bottom, and about one-sixth of the way up; and 55, 56, and 57 similarly located on the right arm. Sensors 51, 52, and 53 are connected to electrical lead 54, while sensors 55, 56, and 57 are connected to similar lead 58. Both leads lie along the inside wall and extend out of the open downstream end of the conduit to the exterior, where they connect to timer 22, whose structure and operation are described further below.

As also shown in FIG. 2, the ends of upstream collar 32 are downturned away from the inside wall of the surrounding conduit to form pair of flanges 61, 63 joined by bolt 62 provided with adjusting nuts. Downstream collar 34 has handles 65 and 66 extending longitudinally downstream from the respective ends of the collar and then extending radially outward and finally longitudinally downstream again in a modified Z shape. Handle 65 has flange 67, and handle 66 has flange 69, affixed thereto with bolt 68 intervening and provided with adjusting nuts.

Figure 4:
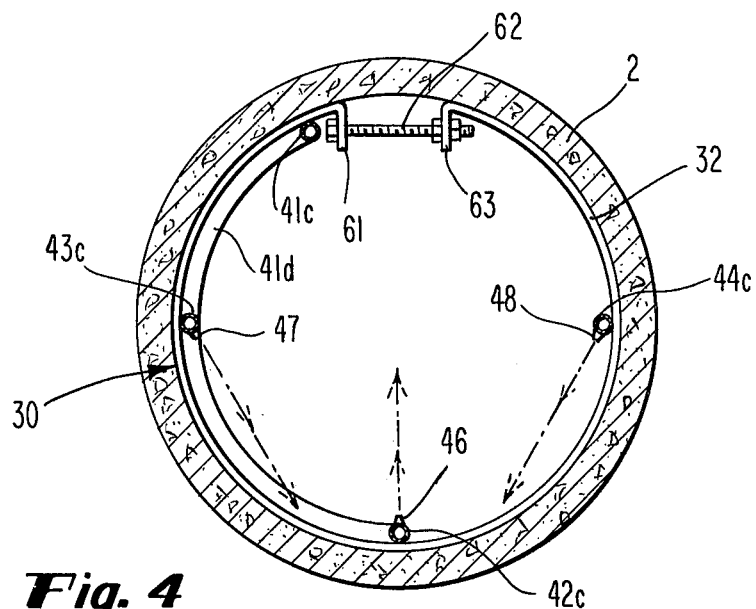
FIG. 4 is a transverse sectional elevation of the probe of the preceding views, taken looking upstream, at IV—IV on FIG. 3.

FIG. 4 shows upstream collar 32 of the probe from the downstream end, with connecting tubes 41c, 42c, 43c, and 44c in section. Bottom jet 46 is directed upward, while side jets 47 and 48 are directed obliquely downward and inward.

FIG. 5 shows downstream collar 34 of the probe from the downstream end, omitting any showing of the parts shown in FIG. 4, which are beyond the plane of this view. As in that view also, all parts capable of entering a conduit within which the probe will fit are configured to lie along the inside wall of the conduit, either in contact therewith or in contact with the inside wall of one of the collars—which amounts to essentially the same thing as the parts are localized along the flow boundary in the conduit where interference is practically nil.

Thus, it will be understood that the invention provides intermittent and brief injection of electrically conductive fluid into the flow through the conduit, that the flow carries the fluid downstream where it is detected by the sensors of electrical conductivity as a rapid increase over any prevailing level of conductivity. The elapsed time interval is converted to a flow rate and is recorded, as is the corresponding flow depth sensed at a location upstream from the jet location.

It will be understood that the probe of this invention is to be inserted into a conduit of appropriate size. The adjusting nuts for the upstream collar are set so that the effective diameter of that collar just enables it to be inserted within the end of the conduit and be pushed upstream sufficiently so that the downstream collar can be inserted also. With its adjusting nuts secured together the downstream collar is compressed by gripping the handles so as to be small enough in diameter to enter the conduit end. Once in place the downstream collar is released by compressing the handles, and the adjusting nuts are screwed apart to expand the collar tightly against the inside wall of the conduit and thereby hold the probe securely.

The multiple jets assure adequate dispersion in the liquid flowing through the conduit, regardless of the flow depth. The conductivity sensors, which preferably are made of inert metallic material, such as platinum or other noble metal, also function irrespective of the flow depth so long as the depth is sufficient to wet the lowermost pair of sensors. Notwithstanding that the sensors are located along the wall where flow is slow, the sensed conductivity is largely accounted for by the intervening flow, so that the method automatically tends to disregard the time discrepancy between slowest and fastest flow layers and to focus—as is desired—upon the transport time of the larger part of the liquid, which necessarily contributes most to the average flow time and rate. A like effect prevails in the action of the three sensors (on each side) inasmuch as the most effective will be the one in contact with the most conductive liquid, as is desired. Other advantages and benefits of this invention will be apparent and will accrue to those persons undertaking to practice it.

Although a preferred embodiment of the invention has been shown and described, it should be understood that modifications may be made therein, as by adding, combining, or subdividing parts or steps, or by substituting equivalents, while retaining advantages and benefits of the present invention, which itself is defined in the following claims.

The claimed Invention:

1. In a probe for sensing electrical conductivity within the open end of a conduit, the combination of support means compressible to fit within the conduit and expansible to be retained frictionally against the inside wall thereof, a plurality of conductivity sensors supported thereby at opposite sides relative to a longitudinal vertical bisector of the conduit, and jet means spaced longitudinally from the sensors for connection to electrically conductive fluid and thereby adapted to release such fluid into the conduit.

2. Sensing probe according to claim 1, including a bubble tube supported thereby and extending along the flow bed of the conduit to terminate in an outlet upstream from the jet means.

3. Sensing probe according to claim 1, including the jet means a plurality of jets supported at different levels within the conduit.

4. Sensing probe according to claim 1, including an upstream collar-like support portion supporting the jet means and the bubble tube, and a downstream collar-like support portion supporting the sensors, and a rigid interconnecting support portion holding the respective collar-like portions at a fixed distance apart.

5. Sensing probe for use in an open conduit, comprising support means compressible to fit within the conduit and expansible to be retained frictionally against the inside wall thereof, a bubble tube supported thereby with an open end adjacent the flow bed within the conduit, a plurality of transversely spaced electrical conductivity sensors supported thereby, and jet means also supported thereby being oriented to jet electrically conductive fluid between the bubble tube outlet and the conductivity sensors therealong.

6. Sensing probe according to claim 5, including upstream and downstream support means rigidly connected longitudinally of one another, the downstream support means supporting the conductivity sensors, and the upstream support means supporting the jet means and the bubble tube.

7. Sensing probe according to claim 6, wherein the bubble tube and tubes for supplying electrically conductive fluid to the jets comprise rigid interconnecting means for the upstream and downstream support means.

* * * * *